United States Patent
Wilson

(10) Patent No.: US 8,549,079 B2
(45) Date of Patent: Oct. 1, 2013

(54) DRAG AND DROP FORWARD E-MAIL REPLY UTILITY

(75) Inventor: Jeff K. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1654 days.

(21) Appl. No.: 11/621,133

(22) Filed: Jan. 9, 2007

(65) Prior Publication Data

US 2008/0168373 A1    Jul. 10, 2008

(51) Int. Cl.
*G06F 15/16* (2006.01)
(52) U.S. Cl.
USPC .......................... 709/206; 709/227; 715/769
(58) Field of Classification Search
USPC ................................ 709/206, 227; 715/769
See application file for complete search history.

(56) References Cited

U.S. PATENT DOCUMENTS

| | | | |
|---|---|---|---|
| 5,768,505 A | 6/1998 | Gilchrist et al. | |
| 6,301,245 B1 | 10/2001 | Luzeski et al. | |
| 6,633,630 B1 | 10/2003 | Owens et al. | |
| 6,789,107 B1 | 9/2004 | Bates et al. | |
| 6,915,332 B1 | 7/2005 | Zdepski | |
| 7,461,151 B2* | 12/2008 | Colson et al. | 709/227 |
| 2003/0182379 A1* | 9/2003 | Henry | 709/206 |
| 2004/0083269 A1* | 4/2004 | Cummins | 709/206 |
| 2004/0103154 A1* | 5/2004 | Perepa et al. | 709/206 |
| 2007/0005717 A1* | 1/2007 | LeVasseur et al. | 709/206 |
| 2007/0294353 A1* | 12/2007 | Marks et al. | 709/206 |
| 2010/0223338 A1* | 9/2010 | Hodes | 709/206 |

OTHER PUBLICATIONS

Kiyohiko Okayama, UNIX Toolbox (11), UNIX Magazine, vol. 10, No. 8, Japan, ASCII Corporation, Jun. 11, 1995, vol. 10, No. 8, pp. 131-148.
Japanese Patent Office; Translated portions of Office Action concerning Kiyohiko Okayama, UNIX Toolbox (11); (provided as indication of relevance of NPL1); Office Action date: Dec. 13, 2011.

* cited by examiner

*Primary Examiner* — Thuong Nguyen
(74) *Attorney, Agent, or Firm* — Brevetto Law Group

(57) ABSTRACT

Methods and Systems are provided for efficiently forwarding e-mail. The e-mail is forwarded in response to being dragging and dropping it into another e-mail. A user selects the e-mail to be forwarded, drags and drops it into another e-mail with the desired distribution list, resulting in a third e-mail being created addressed to the desired distribution list and including the e-mail to be forwarded.

20 Claims, 3 Drawing Sheets

DRAG AND DROP FORWARD E-MAIL REPLY UTILITY

BACKGROUND

1. Field

The present invention relates to electronic communication, and more specifically systems and methods of communicating via e-mail.

2. Background

In recent years e-mail has become a widely accepted a form of communication in most households and nearly all businesses. The vast majority of people who own computers use e-mail to communicate on a regular basis, with billions of e-mail messages being sent each day. Quite often a person receives an e-mail, and after reading it, wants to forward it to another person or a group of people. Forwarding an e-mail with a conventional e-mail application requires that the user clicks the "Forward" button (or other such control) and manually enter an e-mail address of the recipient(s) in the "To:" field. This is not a terribly difficult process, especially if the e-mail addresses of the recipients are in the address book of the user's e-mail application. However, each time this is done it takes the user a short period of time, say, anywhere from a few seconds to as much as a minute or more. It can take a lot longer than this for e-mail addresses which do not happen to be in the address book of the user's e-mail application. These short periods of time can add up to significant amounts of time spent each day if the user is in a position that requires information received in e-mails to be funneled forward to other users. For example, a user who manages or coordinates a project often receives dozens or even hundreds of incoming e-mails from many different sources which must be read and forwarded to the appropriate group of people on a daily basis. Another typical scenario occurs when a new person joins an existing project, and someone is tasked with forwarding all of the relevant e-mail to that person so they can get up to speed on the project.

Using convention systems to forwarding e-mail can be time consuming and lead to errors if the e-mail address is mistyped or the wrong address is cut-and-pasted from elsewhere. What is needed is a more robust, convenient means of forwarding e-mail communications.

SUMMARY

Embodiments disclosed herein address the above stated needs by providing systems, methods and computer software for forwarding e-mail. In various embodiments a user selection is detected for an e-mail to be forwarded. The system associates the selected e-mail with an existing e-mail having a distribution list that the user wants to use in forwarding the e-mail. The e-mail selected for forwarding may be associated with the existing in response to it being dragged and dropped into the existing e-mail. Once the selected e-mail has been associated with the existing e-mail (e.g., dragged and dropped into it), a new e-mail is created including the selected e-mail. The newly created e-mail has the distribution list of the existing e-mail. In various embodiments the distribution list of the new e-mail may be edited.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Figure 1:
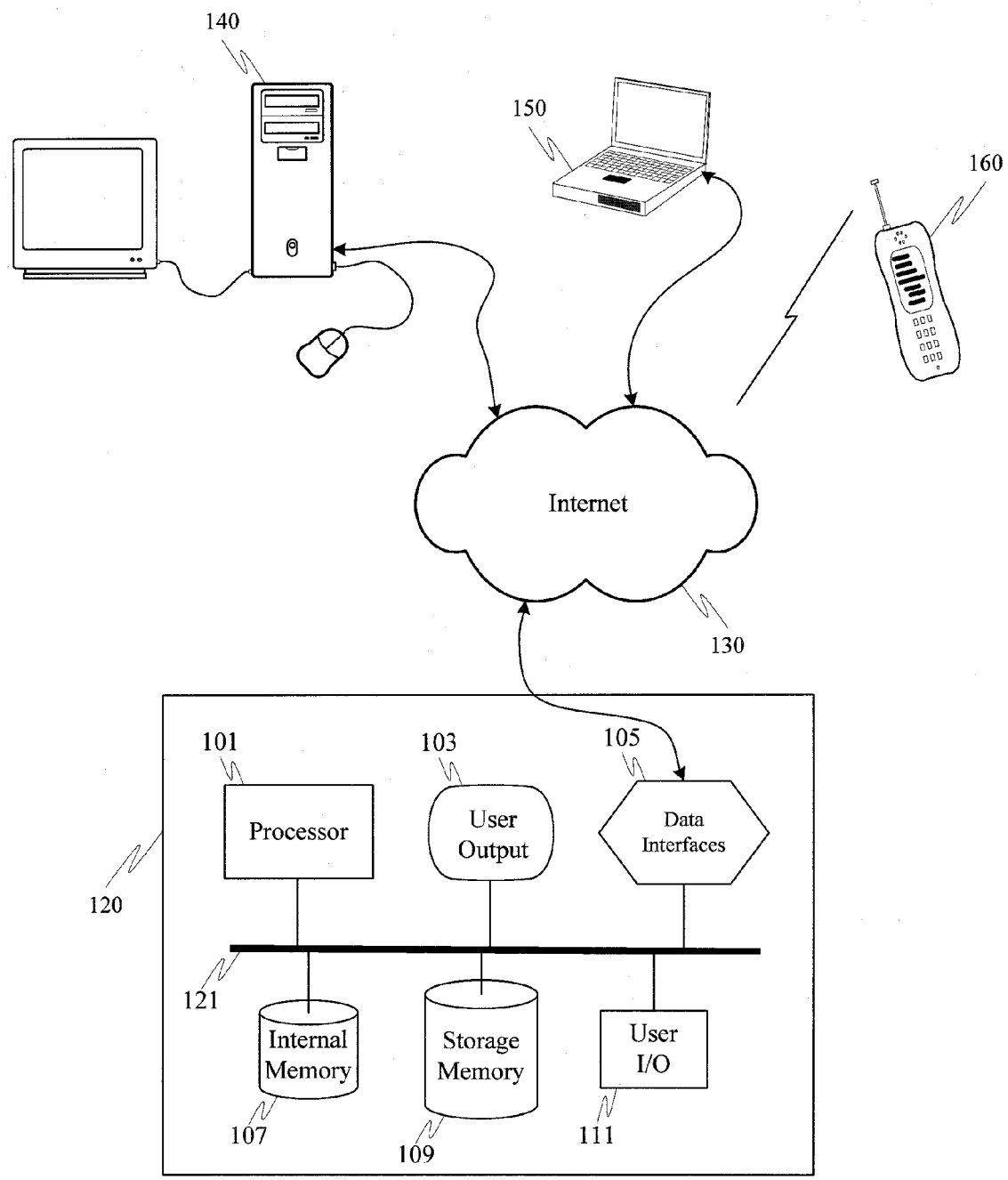
FIG. 1 depicts an exemplary system for practicing various embodiments of the invention.

FIG. 1 depicts an exemplary system 100 for practicing various embodiments of the invention. FIG. 1 shows a desktop computer system 140, a notebook computer 150 (sometimes called a laptop) and a wireless device 160 which may be embodied as a cellular telephone, a two-way pager, or other like type of wireless device for sending and receiving e-mail. These devices are included in the disclosure for illustration purposes only. In practice any device capable of sending and receiving e-mail may be configured to implement various embodiments of the invention. The communication device 120 depicts a block diagram with exemplary elements often included in the desktop computer system 140, the notebook computer 150 or the wireless device 160.

Each of the devices depicted in FIG. 1—the desktop computer system 140, the notebook computer 150, the wireless device 160, and the communication device 120—are configured to send and receive e-mail. E-mail is often sent via the Internet 130, as shown in FIG. 1, but may be sent using any suitable type of network or communication connection known to those of ordinary skill in the art. The desktop computer system 140, the notebook computer 150 and the communication device 120 are shown as being connected by wired connection to the Internet 130. The wireless device 160 is shown connected to the Internet via a wireless link such as a cellular telephone link or a two-way pager link. These devices, or any equivalent devices used to practice the invention, may either be connected by a wired connection, by a wireless connection, or may be connected using a combination of wired and wireless links.

The communication device 120 may include typical information handling system hardware such as the processor 101. The processor 101 may be implemented as a central processing unit (CPU) containing circuitry or other logic configured to perform or control the processes, steps and activities involved in practicing the embodiments disclosed herein. The processor 101 may be embodied as either a microprocessor or an application specific integrated circuit (ASIC), may be a combination of two or more distributed processors, or any other circuitry or logic capable of carrying out commands or instructions, for example, the commands or instructions in e-mail application software or other communication software. In various embodiments, the processor 101 may run a computer program or routine which performs one or more of the activities depicted in FIGS. 2 and 3, or otherwise discussed herein or known to those of ordinary skill in the art.

The processor 101 is interconnected to internal memory 107 and storage memory 109. The components of the communication device 120 are typically interconnected via one or more buses, represented in FIG. 1 as bus 121. For example, the processor 101 is configured to communicate with internal memory 107 and storage memory 109 via the bus 121 or by way of another like type of wired or wireless communication links. Although the bus 121 is depicted as a single bus connecting all of the component parts of the system, the communication device 120 may include two or more separate buses each connected to a subset of the system components.

The internal memory 107, sometimes referred to as a local memory, may be any of several types of storage devices used for storing computer programs, routines, or code, including the instructions and data for carrying out activities of the various embodiments such as the activities discussed herein. The internal memory 107 and storage memory 109 may be implemented in any form suitable for storing data in a computer system, for example, as random access memory (RAM), read only memory (ROM), flash memory, registers, hard disk, or removable media such as a magnetic or optical disk, or other storage medium known in the art. Either of the memories 107 and 109 may include a combination of one or more of these or other such storage devices or technologies. The internal memory 107 and storage memory 109 may each be configured to store all or parts of a computer program product which performs the various activities in forwarding an e-mail in accordance with the various embodiments.

The communication device 120 also includes one or more input/output (I/O) units such as user display output 103 and user input/output (I/O) device 111. The user output display 103 may be implemented in the form of any visual output device, and may be interfaced to bus 121 by a graphics adapter (not shown). For example, the user output display 103 may be implemented as a cathode ray tube (CRT) monitor, a liquid crystal display (LCD) screen, or other like type of display screen or monitor. Typically, the output 103 (e.g., computer screen) is configured to display a view controlled by the processor 101 running the e-mail application software. The user output 103 may include other output devices in addition to a video monitor, such as one or more LED indicator lights, or audio speakers, or other like type of output units.

The communication device 120 typically includes one or more user I/O devices 111 such as a keyboard, a mouse, a tablet surface and pen, a microphone and speech recognition routine, or other like types of input/output devices known to those of ordinary skill in the art. The user I/O device 111 may be interfaced to bus 121 by an I/O interface (not shown) and may be connected either by cables or wirelessly to the communication device 120. The user output 103 and user I/O 111 may include other devices known to those of ordinary skill in the art and suitable for use with a computer system or communication device for communicating data and commands between the communication device 120 and a user of the device.

The communication device 120 is typically configured to include one or more data interface units 105 suitable for connecting to one or more networks such as the Internet 130, a local area network (LAN), a wide area network (WAN), the Public Switched Telephone System (PSTN), a wireless telephone network, or the like. The data interface unit 105 may include a wired and/or wireless transmitter and receiver. The data interface unit 105 may be implemented in the form of multiple units, including, for example, a modem and/or a network adapter. The communication device 120 may be connected via a network (e.g., LAN, WAN, or the like) to one or more other information handling systems, computers, dumb terminals, or telecommunications devices which participate in running or carrying out instructions from the application, for example, to implement the various activities disclosed herein.

Figure 2:
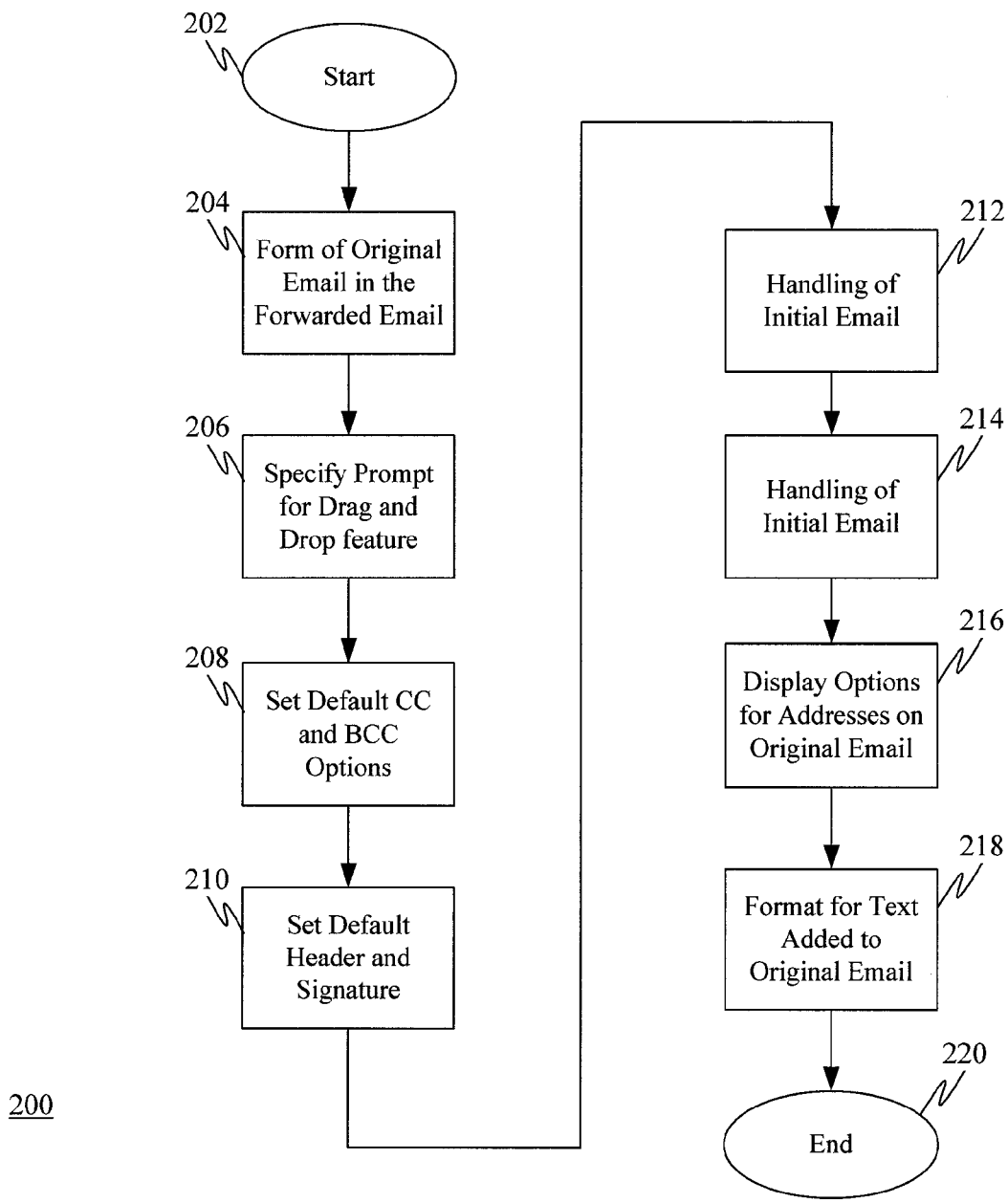
FIG. 2 depicts an exemplary method of setting up a communication device to operate according to various embodiments.

FIG. 2 depicts an exemplary method 200 of setting up a communication device to operate according to various embodiments. The method begins at 202 and proceeds to 204 where the user may specify the form that the e-mail selected for forwarding takes in the new e-mail to be forwarded. For example, the selected e-mail may be included as an attached file, or may simply appear as text at the bottom of the forwarded e-mail. Alternatively, the selected e-mail may be embedded in the forwarded e-mail as an object; e.g., a text box or an image, or may be provided in any other format known to those of ordinary skill in the art. Once 204 has been completed, and the form that the selected e-mail takes in the forwarded e-mail has been specified, the method proceeds to 206.

In 206 the user may specify whether prompts are to be provided for various drag-and-drop-forward features in the e-mail application. For example, if a user picks up an e-mail with the cursor and drops it on another e-mail, the application may be configured to provide a prompt saying: "Do you want to drag-and-drop-forward this e-mail?" or another similar message. Alternatively, the drag-and-drop-forward application can be configured without prompts, in which case the application would simply create the e-mail to be forwarded in response to having another e-mail dragged and dropped into it. Other features of the drag-and-drop-forward application may be configured to have prompts, in order to provide feedback to the user as the application is being used. Once the prompts have been specified in 206 the method proceeds to 208.

In 208 the default options are set for the blind copy recipients ("BCC") and carbon copy recipients ("CC") of the drag-and-drop-forward e-mail. That is, the application may be configured to always send a CC and/or a BCC to one or more specified e-mail addresses when a drag-and-drop-forward e-mail is sent. The CC and BCC recipients may be added or changed for each e-mail sent, but the default setting allows the user to predefine the most common situation in order to make the sending of drag-and-drop-forward e-mails more efficient. The method proceeds to 210 once the default BCC and CC recipients have been specified in 208. In 210 the user may choose to set up the default header and signature, if any, to be used in their drag-and-drop-forward e-mails. For example, the user may opt to include their address, company name or other information in the header or signature portion. Typically, the signature line includes a closing such as, "Sincerely, Username." Quite often a legal disclaimer is included at the bottom of the sent e-mail, for example, requesting that an e-mail sent in error not be forwarded to others. The user may store several different alternative headers and signatures, with text tailored for various e-mail situations and contexts. This would allow the user to select the most appropriate header and signature line for a given e-mail. Once the header and signature options have been specified the method proceeds to 212.

In 212 the user may specify how the application is to handle the originally received e-mail, selected for forwarding, once the drag-and-drop-forward e-mail has been sent. In some embodiments the selected e-mail (the e-mail being dragged and dropped into another e-mail to forward it) remains in the same state as it was before being dragged and dropped forward in another e-mail. That is, it is put back in the Inbox folder (or other folder) of the e-mail application that the selected e-mail was in before being dragged-and-dropped. In other embodiments the application may be configured to automatically put the originally selected e-mail into a specified folder once it has been dragged and dropped forward. For example, once it has been dragged-and-dropped forward, the application may put the selected e-mail into a folder labeled "Forwarded e-mail" or other special folder. Alternatively, the application can be configured to delete the initial selected e-mail instead of storing it in a predefined folder.

Once the handling of the selected e-mail has been specified in 212, the method proceeds to 214. In accordance with various embodiments, an e-mail is forwarded by dragging-and-dropping it onto another e-mail, thus using the distribution list of the other e-mail. In 214 the default option for handling the other e-mail (being used for its distribution list) is specified. In some embodiments the e-mail being used for its distribution list is included in a newly e-mail. In other embodiments only the distribution list is used—that is, when an e-mail to be forwarded is dragged-and-dropped onto another e-mail, a new e-mail is created using the distribution listed of the other e-mail (i.e., the e-mail onto which the forwarded e-mail was dropped). In some embodiments, the application may be configured to include a prompt asking whether the other e-mail is to be included, or only used for its distribution list, in creating the new e-mail.

Upon completing 214 and deciding how to handle the e-mail being used for its distribution list, the method proceeds to 216 to set up the options for displaying the recipient addresses of the selected e-mail. This is often important to a user because one or more of the recipients or the sender of the selected e-mail may desire to remain anonymous. The application may be configured to either include, or not include, the address information of the originally selected e-mail when it is dragged and dropped forward in a new e-mail. Alternatively, the drag-and-drop-forward e-mail may include some, but not all, of the addressee information. In this way the routing information of some of the selected e-mail's recipients/senders may be kept confidential. Once 216 has been completed and the options have been set for displaying the addresses of the selected e-mail's recipients/senders, the method proceeds to 218.

In 218 the options are specified to control the formatting of text added to the selected e-mail, in the event it is annotated or altered. It may be the case that the user does not want to distinguish between the originally included text of the selected e-mail and text later added or edited. However, in some embodiments the original text may appear one way while the text subsequently added will be distinguishable, (e.g., a different font, color, underlining, etc.) or will be marked as an insertion. The changes may also be identified to the user who made them, either in the text itself or in a pop-up window. This helps to ensure the integrity of the selected e-mail, while at the same time affording the opportunity to add notes, comments or corrections to the selected e-mail. Once the options and parameters of the drag-and-drop-forward e-mail application have been specified the method proceeds to 220 and ends.

Figure 3:
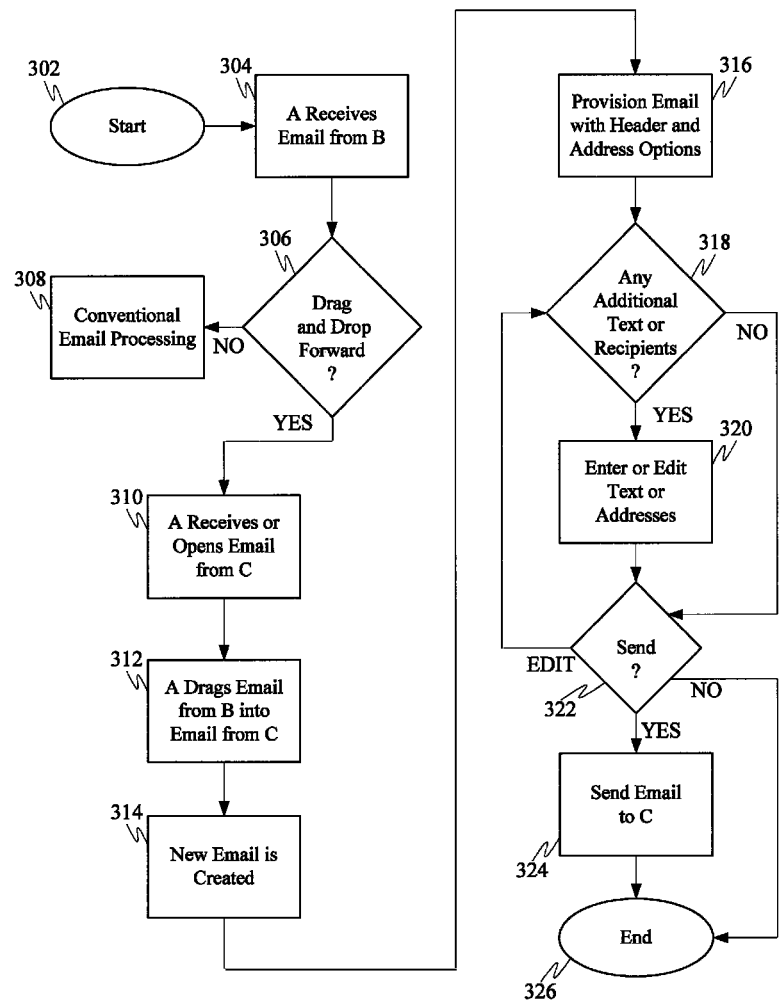
FIG. 3 is an exemplary method for practicing various embodiments of the invention.

FIG. 3 is an exemplary method 300 for practicing various embodiments of the invention. In the figure, for ease of illustration the terms "A," "B," and "C" have been used to denote the people (or e-mail applications) using the embodiments. "A" is the user who receives the original e-mail from another person "B," the sender of the original e-mail. The user A selects the received e-mail in order to drag-and-drop it forward to a person or group of people "C," the intended recipients. The method begins in 302 and proceeds to 304 where an e-mail is received by "A," as shown in FIG. 3. The e-mail is selected to be forwarded. For the purposes of explanation herein, the received e-mail—which is to be dragged-and-dropped forward—is called the "selected e-mail," (but may also be know as the "original" or "initial" e-mail).

In 306 it is determined whether the user intends the selected e-mail to be dragged-and-dropped forward, or handled in another manner. In some embodiments the application may determine that an selected e-mail is to be dragged-and-dropped forward when the user drags the selected e-mail from its spot in the e-mail Inbox and drops it onto another e-mail. This may also be achieved by dragging either an icon, the Taskbar button of an open e-mail, or any other representation of the selected e-mail, and dropping it onto the representation of the e-mail to be forwarded. In some embodiments, the application may determine that an selected e-mail is to be dragged-and-dropped forward in response to the selected e-mail (or a representation of it) being dragged and dropped into a predefined folder or an entry in the user's Address Book of the application. If it is determined in 306 that the selected e-mail is not to be dragged-and-dropped forward the method proceeds along the "NO" branch to 308, and the e-mail is handled in the conventional manner.

If it is determined in 306 that the selected e-mail is to be dragged-and-dropped forward the method proceeds to 310 along the "YES" branch from 306. In 310 the user identifies an existing e-mail from the intended recipient (or an e-mail previously sent to the intended recipient) of the selected e-mail to be forwarded. The identified e-mail is to be used for its distribution list to determine the recipient's addresses to which the dragged-and-dropped e-mail is to be sent. The distribution list on the identified e-mail need not be a perfect match for the dragged-and-dropped e-mail. That is, the identified e-mail may include some addresses than are not desired, or may lack some e-mail address that the user wants to include. In such a case the user may edit the distribution list of the dragged-and-dropped e-mail to suit the present needs. In some embodiments the distribution list from the identified e-mail may include not only the recipients of the identified e-mail, but also the sender of the identified e-mail. Depending upon the options selected to configure the application, the identified e-mail may either become part of the newly created e-mail used to forward the selected e-mail, or the identified e-mail will not become part of the forwarded e-mail and instead only its distribution list will be used. Once an e-mail has been identified in 310 for use in creating a distribution list, the method proceeds to 312.

In 312 the user drags the selected e-mail to be forwarded to the identified e-mail and drops it into the identified e-mail. Typically this action is performed in a graphical user interface (GUI) environment that incorporates movable windows, icons and a cursor. The cursor is movable by the user, for example, by manipulating the user I/O 111 depicted in FIG. 1 (e.g., a mouse, trackball, tablet pen, or the like). For example, in many GUI environments the user places a cursor over the selected e-mail, depresses a cursor button to select it, and then moves the cursor (now affixed to the e-mail) over the identified e-mail to drag it. In this way the user can drag the e-mail to position it over the identified e-mail containing the desired distribution list. When the cursor button is released, the e-mail to be forwarded is dropped onto the identified e-mail. Other similar methods for dragging and dropping, or associating one object with another, which may be known to those of skill in the art may be used in 312. The identified e-mail containing the distribution list may either be open, for example, in an overlapping window, or may be closed and simply appear on a list in the user's Inbox of the e-mail application program. Once 312 has been completed, and the selected e-mail to be forwarded to the identified e-mail has been dragged and dropped into the identified e-mail, the method proceeds to 314.

In 314 a new e-mail is created in response to having an e-mail dropped into the identified e-mail containing the distribution list. In accordance with various embodiments the new e-mail's distribution list is generated from the distribution list (sender and/or recipients) of the identified e-mail that the forwarded e-mail was dropped onto. The identified e-mail (onto which the selected e-mail is dropped) may either become part of the new e-mail, or it may only be used to create the distribution list of the new e-mail, depending upon the preferences of the application program selected by the user. Once the new e-mail has been created in 314 the method proceeds to 316 to address, provision and format the new e-mail. Typically, the new e-mail is addressed to the existing distribution list of the existing e-mail—that is, the e-mail from "C" onto which the selected e-mail is dropped. The addressing of the new e-mail to the existing distribution list is performed by the e-mail software application in accordance with the present invention. The addressing is done in response to the selected e-mail being dragged-and-dropped into the existing e-mail. The new e-mail may take any of several forms, depending upon the preferences and options set up in accordance with the procedure discussed in conjunction with FIG. 2. For example, the new e-mail may contain a specified default header and signature line, either with the text of the old e-mail in the body of the selected e-mail (e.g., below), with the selected e-mail included as a file attached to the new e-mail, or with the selected e-mail being embedded as an object (e.g., image or text box) within the new e-mail. Also, the various default fonts and any other settings affecting the look and form of the e-mail are provisioned in 316. Once the e-mail has been initially provisioned in 316, the method proceeds to 318.

In 318 it is determined whether the distribution list of the identified e-mail is suitable for the purposes of the new e-mail—that is, whether any e-mail addresses are to be deleted or added to the new e-mail. In addition, in 318 the user has the option to add text to the new e-mail, such as an explanatory note or message for the body of the new e-mail. This may be done by providing a prompt box to the user asking whether the new e-mail, containing the selected e-mail, is ready to be forwarded. If the new e-mail is ready to be forwarded—for example, based upon the user's response to a prompt—the method proceeds from 318 along the "NO" branch to 322. If, however, it is determined in 318 that the user wants to enter more addresses, or edit the text message or addresses of the new e-mail, the method proceeds from 318 along the "YES" branch to 320. In 320 the user is afforded the opportunity to add or deleted e-mail addresses from the distribution list of the new e-mail, add or edit text in the message of the new e-mail, or otherwise alter the new e-mail. Once the user is finished editing the new e-mail the method proceeds from 320 to 322.

In 322 it is determined whether the e-mail is ready to be sent, needs further editing, or for some reason the user no longer wants to send the e-mail. If the user no longer wants to send the e-mail the method proceeds to 326 and ends. If, however, it is determined that the user wants to edit the e-mail further, the method proceeds back to 318 along the "EDIT" path, giving the user another change to change the distribution list or otherwise alter the new e-mail. Back in 322 if it is determined that the user wants to send the e-mail—for example, in response to the user hitting a "SEND" button or other control of the e-mail application program—the method proceeds to 322 along the "YES" path to 324. In 324 the new e-mail, which forwards the selected e-mail, is sent to the e-mail recipients specified in the distribution list. The method then proceeds to 326 and ends.

Various embodiments may be implemented in, or in conjunction with, a number of different e-mail applications, including but not limited to: Lotus Notes, Microsoft Outlook, Eudora, Mozilla Thunderbird, Pegasus, Claris, Blitzmail, Pronto Mail, Mutt, Pine, or other like types of e-mail applications known to those of ordinary skill in the art. In some embodiments, several or all of the functions outlined above for practicing the invention may be carried out either in the e-mail application program itself or by an application program, routine or other logic working in conjunction with the e-mail application.

The various embodiments have been discussed above in terms of being implemented by dragging and dropping an e-mail to be forwarded into another e-mail containing a distribution list to which the user wants to send the selected e-mail. However, in some embodiments the selected e-mail may be dragged and dropped into a folder of the e-mail application predefined for the purpose of forwarding e-mails. Alternatively, the selected e-mail may be dragged and dropped onto a contact entry in the user's Contact Folder of their e-mail application (e.g., a persons e-mail address or a predefined distribution list of addresses). Also, the embodiments are discussed in terms of dragging and dropping the e-mail to be forwarded into another e-mail that has the desired distribution list. In some embodiments the e-mail with the desired distribution list may be dragged and dropped into the e-mail to be forwarded, resulting in the creation of a new e-mail with the desired distribution list.

Various activities may be included or excluded as described above, or performed in a different order, with the rest of the activities still remaining within the scope of at least one exemplary embodiment. For example, block 304 may be omitted, with the drag-and-drop feature being used to forward existing e-mails or previously sent e-mails rather than received e-mails. Another example of blocks that may be omitted are 318 and 320. In at least one embodiment the application program for implanting the various embodiments may be configured to automatically create an e-mail and forward it in response to having the original e-mail dragged and dropped into it. The options of the application program may be specified to insert some default text, such as "the following e-mail was forwarded to you from John Q. Smith." In such embodiments the flowchart of FIG. 3 could be configured without blocks 318-320, instead proceeding directly from 316 to 322 (with no "EDIT" branch stemming from 322). Various other steps, actions or elements may be omitted, added or altered, in accordance with various embodiments of the invention, as would be known by those of ordinary skill in the art.

The invention may be implemented with any sort of processing units, processors and controllers (e.g., processor 101 of FIG. 1) capable of performing the stated functions and activities. For example, the processor 101 may be embodied as a microprocessor, microcontroller, DSP, RISC processor, or any other type of processor that one of ordinary skill would recognize as being capable of performing the functions described herein. A processing unit in accordance with at least one exemplary embodiment can operate computer software programs stored (embodied) on computer-readable medium such as the storage memory 109, e.g. hard disk, CD, flash memory, ram, or other computer readable medium as recognized by one of ordinary skill in the art, or the computer software programs may be transmitted wirelessly to the processing unit. The computer software programs can aid or perform the steps and activities described above. For example computer programs in accordance with at least one exemplary embodiment may include: source code for detecting that a user has selected an e-mail to be forwarded, associating the selected e-mail with an existing e-mail in response to the selected e-mail being dragged and dropped into another e-mail. The source code also creates a new e-mail that includes the selected e-mail, in response to the selected e-mail being dropped into the existing e-mail. The new e-mail is configured to be forwarded to a forwarding distribution list based on an existing distribution list of the existing e-mail. An e-mail application for implementing the various embodiments may operate with any type of operating system (OS). For example, e-mail application programs commonly run on graphical user interface (GUI) based operating systems such as Windows® Millenium Edition, Windows® XP, Linux, or the like.

The use of the word "exemplary" in this disclosure is intended to mean that the embodiment or element so described serves as an example, instance, or illustration, and is not necessarily to be construed as preferred or advantageous over other embodiments or elements. The description of the various exemplary embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the spirit and scope of the present invention.

What is claimed is:

1. A method of forwarding an e-mail from a communication device, the method comprising:
   selecting a first e-mail with content for forwarding;
   detecting dragging and dropping of the first e-mail onto an existing second e-mail containing an existing distribution list; and
   creating a new e-mail comprising a copy of said content, and populating the new e-mail with the existing distribution list, said new e-mail being created in response to the first e-mail being dragged and dropped onto the second e-mail;
   wherein said new e-mail is configured to be forwarded to the existing distribution list.

2. The method according to claim 1, wherein the first e-mail is a received e-mail.

3. The method according to claim 1, further comprising:
   determining that the first e-mail is to be forwarded in response to detecting the first e-mail being dragged and dropped onto the second e-mail.

4. The method according to claim 3, wherein the creating of the new e-mail is performed by an e-mail application.

5. The method according to claim 1, further comprising:
   receiving inputs from a user to edit the new e-mail forwarding distribution list for the new e-mail.

6. The method according to claim 1, further comprising:
   receiving an input from a user to send the new e-mail.

7. The method according to claim 1, wherein the new e-mail includes the first e-mail as an attached file.

8. The method according to claim 1, further comprising:
   providing the new e-mail with a predefined signature line in response to the first e-mail being dragged and dropped onto the second e-mail.

9. The method according to claim 1, further comprising:
   displaying a user prompt in response to detecting the first e-mail being dragged and dropped onto the second e-mail, said user prompt inquiring whether the first e-mail is to be forwarded by creating the new e-mail and populating it with the existing distribution list of the second e-mail; and
   detecting a user response to said prompt indicating that the first e-mail is to be forwarded.

10. A software product comprising an electronically readable non-transitory storage medium including a program of instructions, wherein the program of instructions upon being executed on a device causes the device to:
    select an e-mail with content for forwarding;
    detect dragging and dropping of the first e-mail onto an existing second e-mail containing an existing distribution list; and
    create a new e-mail and populate the new e-mail with the existing distribution list in response to the first e-mail being dragged and dropped onto the second e-mail;
    wherein said new e-mail is configured to be forwarded to the existing distribution list.

11. The software product according to claim 10, further comprising:
    determining that the first e-mail is to be forwarded in response to detecting the first e-mail being dragged and dropped onto the second e-mail.

12. The software product according to claim 11, wherein the new e-mail is created by an e-mail application.

13. The software product according to claim 10, further comprising:
    receive inputs from a user to edit the new e-mail forwarding distribution list for the new e-mail.

14. The software product according to claim 10, wherein the new e-mail includes the first e-mail as an attached file.

15. The software product according to claim 10, further comprising:
    provide the new e-mail with a predefined signature line in response to the first e-mail being dragged and dropped onto the second e-mail.

16. The software product according to claim 10, further comprising:
    display a user prompt in response to detecting the first e-mail being dragged and dropped onto the second e-mail, said user prompt inquiring whether the first e-mail is to be forwarded by creating the new e-mail and populating it with the existing distribution list of the second e-mail; and
    detect a user response to said prompt indicating that the first e-mail is to be forwarded.

17. A system configured for forwarding a first e-mail, the system comprising:
    a non-transitory electronically readable storage medium configured to store an e-mail application program;
    a user input device responsive to user inputs for dragging and dropping the first e-mail onto an existing second e-mail containing an existing distribution list; and
    a processor configured to process instructions in the e-mail application to create, in response to detecting the first e-mail being dragged and dropped onto the second e-mail, a new e-mail including the existing distribution list;
    wherein said new e-mail is configured to be forwarded to the existing distribution list of the second e-mail in response to detecting movements of the user input device for dragging and dropping the first e-mail onto the second e-mail.

18. The system according to claim 17, wherein the user input device is a mouse configured to manipulate a cursor.

19. The system according to claim 17, wherein the processor is further configured to process instructions in the e-mail application to provide the new e-mail with a predefined signature line in response to the first e-mail being dragged and dropped onto the second e-mail.

20. The system according to claim 17, further comprising:
    a display device configured to display a user prompt in response to detecting the first e-mail being dragged and dropped onto the second e-mail, said user prompt inquiring whether the first e-mail is to be forwarded by creating the new e-mail and populating it with the existing distribution list of the second e-mail;

wherein the user input device is further configured to detect a user response to said prompt indicating that the first e-mail is to be forwarded.

* * * * *